United States Patent
Seeley et al.

(10) Patent No.: US 6,962,243 B2
(45) Date of Patent: Nov. 8, 2005

(54) MULTI-DISC BRAKE SYSTEM

(75) Inventors: Gordon J. Seeley, South Lyon, MI (US); Denise M. Strong, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/265,963

(22) Filed: Oct. 7, 2002

(65) Prior Publication Data

US 2004/0065515 A1    Apr. 8, 2004

(51) Int. Cl.$^7$ ............................................. F16D 55/36
(52) U.S. Cl. ................... 188/71.5; 188/73.32
(58) Field of Search .............. 188/71.1, 71.5, 188/72.1, 72.4, 73.31, 73.32, 73.38, 73.42–73.47

(56) References Cited

U.S. PATENT DOCUMENTS

| | | | | |
|---|---|---|---|---|
| 2,043,933 A | * | 6/1936 | Sohl | ......................... 188/18 A |
| 5,310,025 A | | 5/1994 | Anderson | |
| 5,947,234 A | * | 9/1999 | Shimazaki | ............... 188/73.36 |
| 6,131,932 A | | 10/2000 | Bunker | |
| 6,247,560 B1 | * | 6/2001 | Bunker | ..................... 188/18 A |
| 6,484,852 B1 | | 11/2002 | Bunker | |
| 6,520,296 B1 | | 2/2003 | Bunker | |

FOREIGN PATENT DOCUMENTS

| | | | | |
|---|---|---|---|---|
| GB | 2102902 A | * | 2/1983 | ......... F16D 55/224 |
| WO | WO/66908 | | 11/2000 | |

* cited by examiner

Primary Examiner—Xuan Lan Nguyen
(74) Attorney, Agent, or Firm—Michael D. Smith

(57) ABSTRACT

A multi-disc brake system for automotive vehicles includes a plurality of discs slideably supported on a hub and a plurality of brake pad assemblies slideably supported on a bridge projecting from a stationary knuckle body. The pad assemblies are moved by a piston into selective braking engagement with the discs. An outer pad retainer is bolted to the bridge. A supplemental mechanical interlock feature couples the retainer releasably but securely to the bridge independently of the bolts. The pad retainer may alternatively be formed as one piece with the bridge and the bridge formed with a slideway having an access opening for installing and removing the pad assemblies for slideable movement therealong. The discs may further be supported on the hub by a supplemental support which enables sliding movement of the discs along the hub but limits the travel beyond at least one end of the hub so that discs remain on the hub independently of any support provided by the interleaved brake pad assemblies.

4 Claims, 10 Drawing Sheets

MULTI-DISC BRAKE SYSTEM

BACKGROUND OF THE INVENTION

1. Field of the Invention

The invention relates generally to brake systems for vehicles, and more particularly to multi-disc brake systems having discs slideable longitudinally on a hub.

2. Related Art

A typical sliding disc-type brake assembly is disclosed in U.S. patent and includes a knuckle body having a piston cavity for receiving a piston, and a bridge extending outwardly from the knuckle body. A plurality of brake pads are disposed on the bridge and spaced from one another to receive a pair of discs between the brake pads. The pair of discs are disposed on a hub of the brake assembly so that the discs can slide axially or longitudinally along the hub, while being retained against relative movement in a direction of rotation of the hub. The brake pads typically have a pair of spaced apart holes therethrough so that a pair of fasteners can be inserted through the holes and into a pair of threaded holes within the bridge. With the pair of discs received between the brake pads, and with the brake pads secured to the bridge by the fasteners, an outermost brake pad mates with and retains an outermost disc to retain the other disc and pads in an assembled state. Accordingly, the fasteners used to hang the brake pads are also used to bolt the bridge and outer stationary pad to the knuckle body, such that servicing the pads requires disassembly of the bridge from the knuckle body.

A multiple disc system constructed according to the present invention overcomes or greatly minimizes the above limitations of prior multiple disc brake systems both in use and in assembly, particularly with respect to redundant retention of brake system components to the hub of the brake assembly in addition to the fasteners.

SUMMARY OF THE INVENTION

A multi-disc brake assembly constructed according to the present invention has a supplemental or redundant retaining structure to further ensure that the assembly remains in tact and functional.

According to one aspect of the invention, the assembly has a knuckle body with a bridge extending outwardly from the knuckle body to an end spaced from the knuckle body. A plurality of brake pads are provided wherein at least one of the brake pads is slideably supported by the bridge. A disc having opposing sides and an axis of rotation is arranged such that the brake pads make frictional contact with the sides. A pad retainer is formed as one piece with the bridge at an outer end thereof to limit the outward sliding movement of the brake pads beyond the end of the bridge.

According to an alternative aspect of the invention, the assembly includes a brake pad having a backing plate with opposite surfaces and at least one fastener opening extending between the opposing surfaces. The fastener opening has an axis and receives a fastener for coupling the backing plate to a support structure. The backing plate has a layer of friction material disposed on at least one of the opposite surfaces and a mechanical interlocking portion. The mechanical interlocking portion has at least one retaining surface extending transverse to the axis of the fastener opening for providing redundant coupling support of the brake pad to the support structure independent of the fasteners.

According to still a further alternative aspect of the invention, the removal of at least one disc from a rotatable wheel hub is restricted. The wheel hub has an outer surface extending longitudinally between opposite ends, and at least one disc is supported on the wheel hub. The disc is supported against rotation relative to the wheel hub and is slideable longitudinally between the opposite ends and along the outer surface of the wheel hub. A retaining structure acting between the wheel hub and the disc restricts removal of the disc from at least one of the ends of the wheel hub. By preventing the disc from being removed from the wheel hub, the disc brake assembly is prevented from disassembling, and thus the disc of the assembly ensures that pads of the assembly remain in tact and functional independent of the fasteners.

One advantage offered by this invention is that the brake assembly has a redundant connection so that the brake system is maintained in a functional state.

Another advantage offered by this invention is that the number of component parts may be reduced, thereby improving assembly efficiencies and reducing costs.

Another advantage offered by this invention is that the manufacturing efficiencies may be improved, thereby reducing the total manufacturing costs.

Another advantage offered by this invention is that should one of the brake component parts become disassembled from the brake assembly, the brake assembly will remain functional.

It should be understood that the above advantages represent only a partial listing of the advantages offered by this invention, and that one skilled in the art will recognize other advantages upon further disclosure of this invention.

BRIEF DESCRIPTION OF THE DRAWINGS

These and other features and advantages of the present invention will become more readily appreciated when considered in connection with the following detailed description and appended drawings, wherein.

DETAILED DESCRIPTION OF PREFERRED EMBODIMENT

Figure 1:
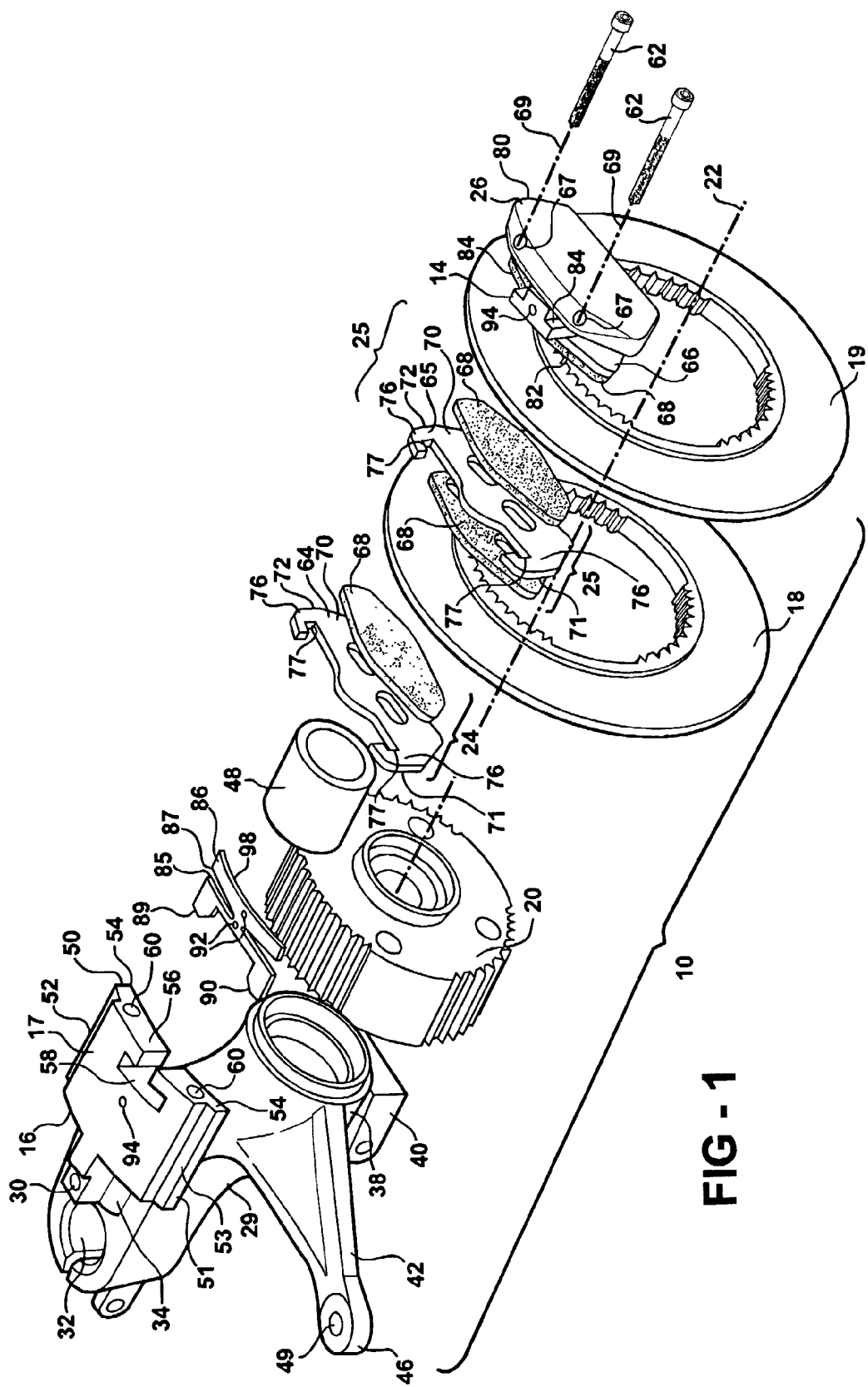
FIG. 1 shows an exploded isometric view of a currently preferred embodiment of the invention of a brake assembly with a brake pad having a redundant mechanical interlocking portion.
Figure 2:
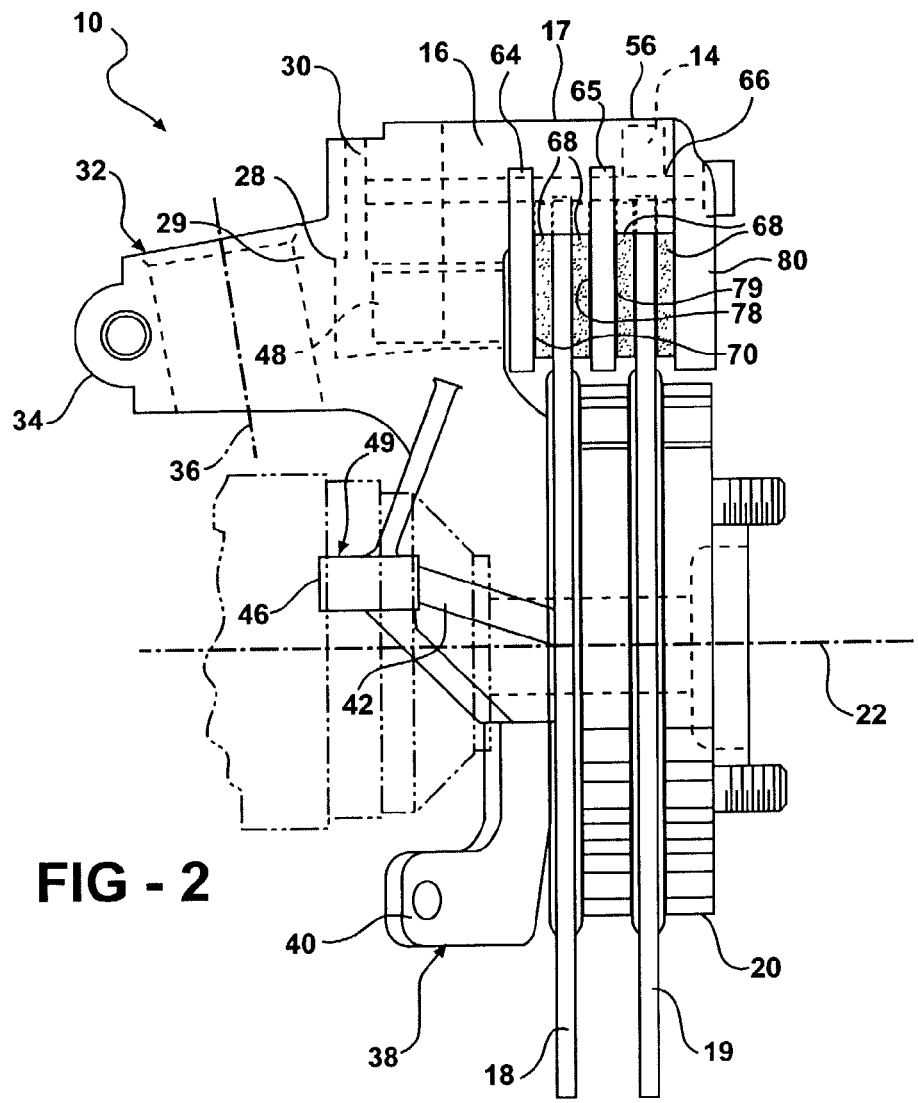
FIG. 2 shows an assembled front view of the brake assembly from FIG. 1.

Referring initially to FIGS. 1 and 2, a disc brake assembly 10 is shown having a redundant mechanical interlocking portion 14 that is received by a support structure or bridge 16 to provide a redundant connection maintaining the assembly 10 in an assembled state. The disc brake assembly 10 has at least one rotor or disc and preferably a pair of rotors or discs, shown here as an inner disc 18 and an outer disc 19 on a rotatable wheel hub 20 for slideable movement along an axis 22 of the disc brake assembly 10. To facilitate braking, a plurality of brake pad assemblies, shown here as an inner, intermediate, and outer brake pad assembly 24, 25, 26 having friction material disposed thereon are disposed slideably on the bridge 16 for contacting the discs 18, 19.

The disc brake assembly 10 has a knuckle body 29 having a generally cylindrical piston chamber 28 formed therein with a port 30 for receiving fluid leading to the piston chamber 28. An opening 32 is formed in an extension 34 of the knuckle body 29 for receiving a strut (not shown) and has an axis 36 about which the disc brake assembly 10 pivots.

A socket 38 is formed in a lower extension 40 of the knuckle body 29 for receiving a pin of a ball joint on a tie bar (not shown). An arm 42 extends laterally from the knuckle body 29 having an opening 49 adjacent an end 46 of the arm 40 for mounting a track bar (not shown) to enable rotation of the disc brake assembly 10 about the axis 36 for turning a vehicle.

The piston chamber 28 in the knuckle body 29 receives a piston 48 for reciprocating movement therein. Hydraulic fluid under pressure is delivered to the piston chamber 28 through port 30 for selective outward movement or actuation of the piston 48 into contact with the inner brake pad assembly 24 to move the inner brake pad assembly 24 into frictional contact with the inner disc 18. In turn, the inner disc 18 is caused to slide into frictional contact with the intermediate brake pad assembly 25. This causes the intermediate brake pad assembly 25 to move into frictional contact with the outer disc 19, which slides into frictional contact with the outer brake pad assembly 26, thus, completing the engagement of the brake pad assemblies 24, 25, 26 with the discs 18, 19 to brake or slow the vehicle. To disengage the disc brake assembly 10, hydraulic pressure is reduced in the piston chamber 28 which causes the piston 48 to retract and allows brake pad assemblies 24, 25, 26 to slide out of frictional stopping engagement with the discs 18, 19.

The bridge 16 of the knuckle body 29 is integrally formed as one piece with the knuckle body 29. The bridge 16 is spaced from and extends generally parallel to the axis 22. The bridge 16 has a top surface 17 and a pair of opposite sides 50, 51 with each side 50, 51 having a respective channel 52, 53 that is preferably stepped to form a slideway 54. It should be recognized that the slideway 54 could be formed using a variety of different contours, such as an arcuate contour, and that the slideway 54 need not have a stepped form as shown. The bridge 16 has an end 56 spaced from the knuckle body 29 with a slot 58 formed therein providing a location for redundant connection of the outer brake pad assembly 26 to the bridge 16. The bridge 16 preferably has a pair of fastener openings 60 spaced inwardly and adjacent each side 50, 51 for receiving a pair of fasteners 62 providing for a primary attachment of the brake pad assemblies 24, 25, 26 to the bridge 16.

The brake pad assemblies 24, 25, 26 have backing plates 64, 65, 66, respectively, having pads 68 of frictional material fixed thereto. The backing plate 26 is fixed to a support plate 80 having fastener openings 67 with associated axes 69 for receiving the fasteners 62. The inner backing plate 64 has a single pad 68 fixed to one side 70 of the backing plate 64. The backing plates 64, 65 have opposite ends 71, 72 with each end 71, 72 having an arcuate portion 76 extending therefrom for slideable engagement with the slideway 54 of the bridge 16. The arcuate portions 76 are formed having a shape that is generally the negative of the shape of the slideway 54 so that the inner brake pad assembly 24 is free to slide along the slideway 54, but wherein a surface 77 of each arcuate portion 76 engages the slideway 54 to prevent removal of the inner brake assembly 24 from the bridge 16.

As best shown in FIG. 2, the innermost brake pad assembly is disposed on the bridge in such position that the brake pad 68 faces away from the knuckle body 29 and the backing plate 64 is disposed adjacent the piston chamber 28.

The backing plate 65 of the intermediate brake pad assembly 25 is shaped generally the same as the backing plate 64 of the inner brake pad assembly 24, however the intermediate brake pad assembly 25 has a pair of brake pads 68 fixed to opposite sides 78, 79 of the intermediate backing plate 64. The intermediate brake pad assembly 25 is supported slideably on the bridge 16 in generally the same manner as the inner brake pad assembly 24.

The outer backing plate 66 has a side 82 facing the knuckle body 29 to which the brake pad 68 is fixed. The outer support plate 80 mounts the mechanical interlocking portion 14, shown here to be preferably generally T-shaped. The mechanical interlocking portion 14 has at least one retaining surface 84 extending transverse to the axis 69 of the fastener openings 67. The surface 84 engages an associated transverse surface of the slot 58 to provide for the redundant attachment of the outer brake pad assembly 26 to the bridge 16. The mechanical interlocking portion 14 is disposed generally between the pair of fastener openings 67 and is preferably spaced equally between the fastener openings 67.

To assist in the reduction of noise and vibration of the disc brake assembly 10 while in use, a spring device 86 that is generally H-shaped and has a pair of legs 85, 87 is disposed on the top surface 17 of the bridge 16 to overlie at least a portion of the arcuate portion 76 of the backing plates 64, 65, 66. Extending from one leg 87 of the spring device 86 are a pair of tabs 89, 90 which overlie the arcuate portion 76 of the inner backing plate 24. The spring device 86 applies a generally radial force to the backing plates 64, 65, 66 of the brake pad assemblies 24, 25, 26 to prevent rattling of the backing plates 64, 65, 66 against the bridge 16. Holes 92 pass through the spring device 86 and are arranged to align with preferably threaded holes 94 formed in the bridge 16 and the mechanical interlocking portion 14, respectively. The spring device 86 is secured by fasteners (not shown). Preferably, a portion 98 of the spring device 86 overlies the slot 58 to block inadvertent removal of the mechanical interlocking portion 14.

Figure 3:
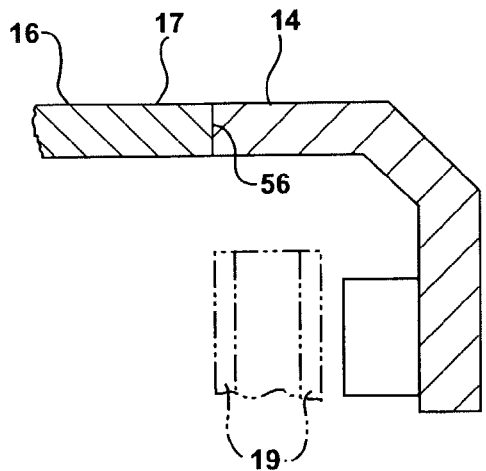
FIG. 3 shows a partial cross-sectional view taken through a bridge of the brake assembly from FIG. 2 showing a disc in an innermost and outermost position.

In operation, and with the additional reference to FIG. 3, the brake pad assemblies 24, 25 and the discs 18, 19 are free to float or slide in the direction of the axis 22 and along the slideway 54 of the bridge 16 when the disc brake assembly 10 is in a disengaged position. When the disc brake assembly 10 is engaged, and the piston 48 extends outwardly from the piston chamber 28 bringing the brake pad assemblies 24, 25, 26 and the discs 18, 19 into frictional contact with one another to prevent rotation of the discs 18, 19 relative to the brake pad assemblies 24, 25, 26. The fasteners 62 provide the primary means of attachment of the outer brake pad assembly 26 to the bridge 16. The mechanical interlocking portion 14 provides a redundant source of attachment of the outer brake pad assembly 26 to the bridge 16. In the event the fasteners 62 are removed from the disc brake assembly 10, the mechanical interlocking portion 14 prevents the outer brake pad assembly 26 from separating from the bridge 16, and therefore, the disc brake assembly 10 remains intact and functional. The mechanical interlocking portion 14 is supported against upward removal from the slot 58 by the overlying spring device 86. The mechanical interlocking portion 14 is supported against downward removal from the slot through interference with the outer disc 19. As shown in FIG. 3, the outer disc 19 interferes with the mechanical interlocking portion 14 throughout the full floating or axial travel of the disc 19

In order to remove the outer brake pad assembly 26 from the bridge 16, the fasteners 62 attaching the outer brake pad assembly 26 to the bridge 16 must be removed. In addition, either the spring device 86 or the outer disc 19 must be removed to allow the mechanical interlocking portion 14 to be removed from the slot 58 in the bridge 16. This results in part because the bridge 16 is preferably formed as one piece with the knuckle body 29. It should be recognized however, that a similar mechanical interlock portion could be used to connect a bridge and a knuckle body made separately from one another (not shown). This would enable the knuckle body and bridge to be formed as separate pieces, while still maintaining a redundant attachment of both a bridge to a knuckle body, and an outer brake pad assembly to the bridge.

Figure 4:
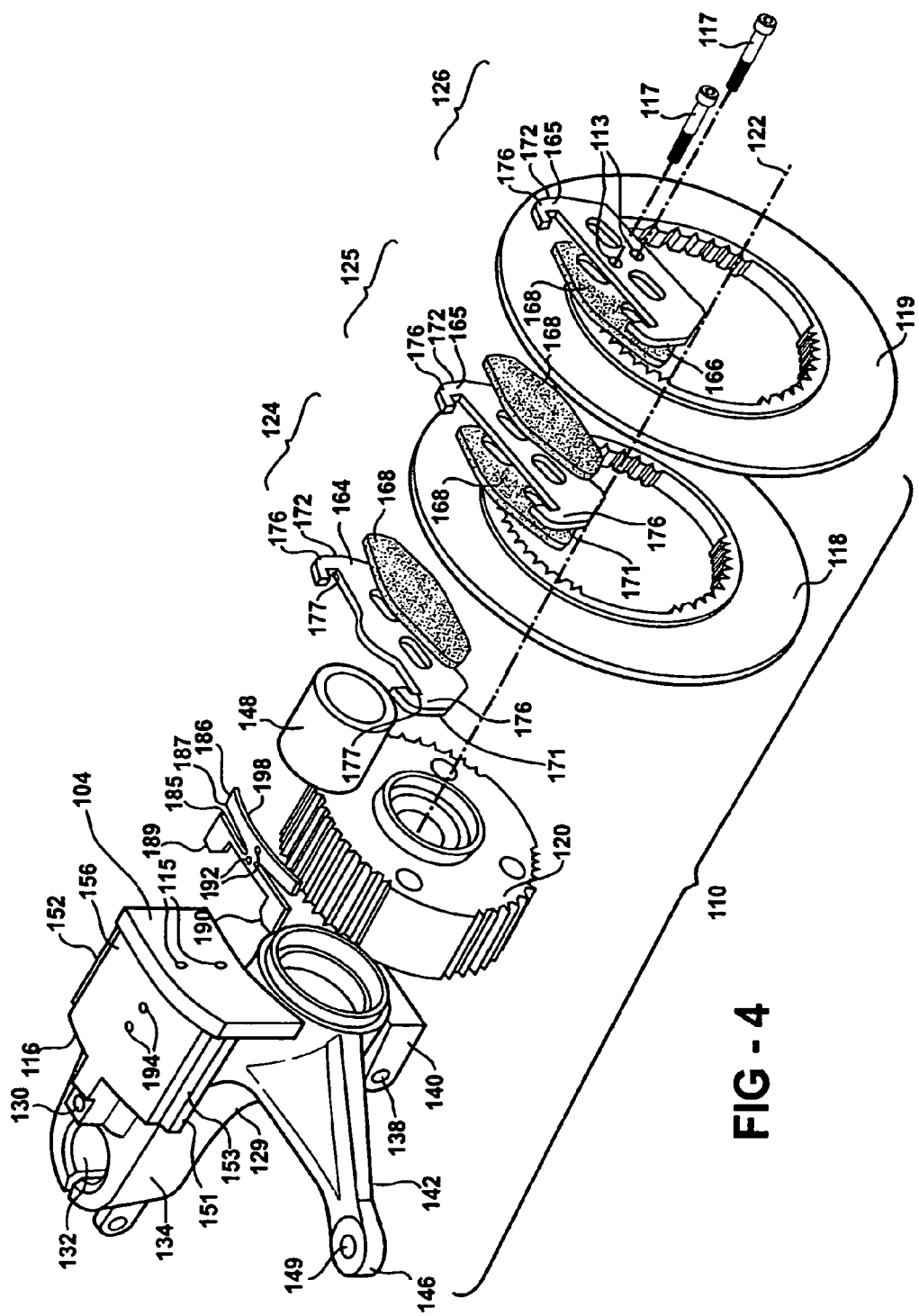
FIG. 4 shows an exploded isometric view of a first alternative embodiment of the invention.
Figure 5:
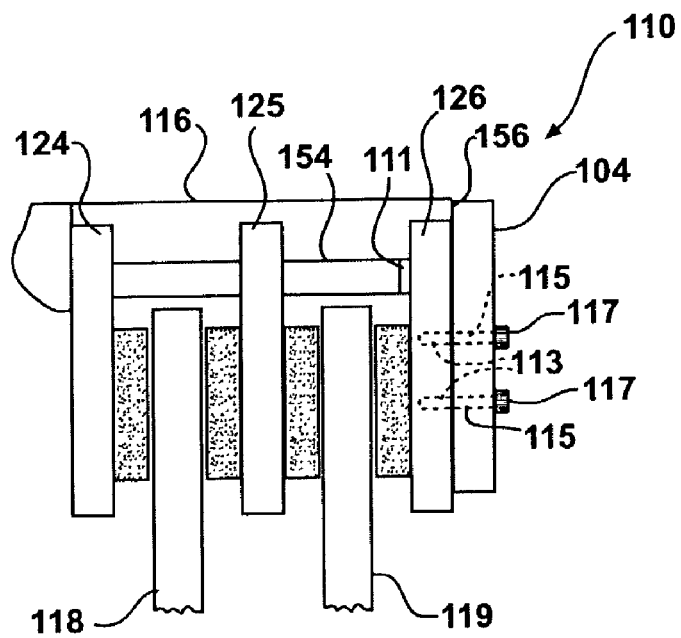
FIG. 5 shows an assembled partial front view of the brake assembly of FIG. 4.

FIGS. 4 and 5 illustrate a first alternative embodiment of the invention, wherein the same reference numerals are used to designate like parts and features, but are offset by 100.

The disc brake assembly 110 has a bridge 116 formed as one piece with the knuckle body 129. The knuckle body 129 has an end 156 with a pad retainer 104 formed as one piece with the bridge 116. Therefore, the knuckle body 129, bridge 116, and the pad retainer 104 are preferably formed as one piece.

As shown in FIG. 5, the bridge 116 has a slideway 154 formed with an opening 111 for receiving brake pad assemblies 124, 125, 126 into the slideway 154 without removal of the outer pad. The opening 111 is disposed adjacent the pad retainer 104 in position so the inner brake pad assembly 124 can first be disposed in the slideway 154, then the intermediate brake pad assembly 125, and finally the outer brake pad assembly 126. The outer brake pad assembly 126 preferably has a pair of threaded holes 113 that align with a pair of through holes 115 in the pad retainer 104, permitting attachment of the outer brake pad assembly 126 to the pad retainer 104 by a pair of fasteners 117. This construction obviates the need to have fasteners 62 passing through the bridge 116 to secure the brake pad assemblies 24, 25, 126 in place. Instead, all that is required are the fasteners 117 that secure the outer brake pad assembly 126 to the pad retainer 104. The pad retainer 104, being formed as one piece with the bridge 116, maintains the disc brake assembly 110 in a functional state. The inner disc 118 remains disposed between the inner brake pad assembly 124 and the intermediate brake assembly 125, and the outer disc 119 remains disposed between the intermediate brake pad assembly 125 and the outer brake pad assembly 126.

Figure 4A:
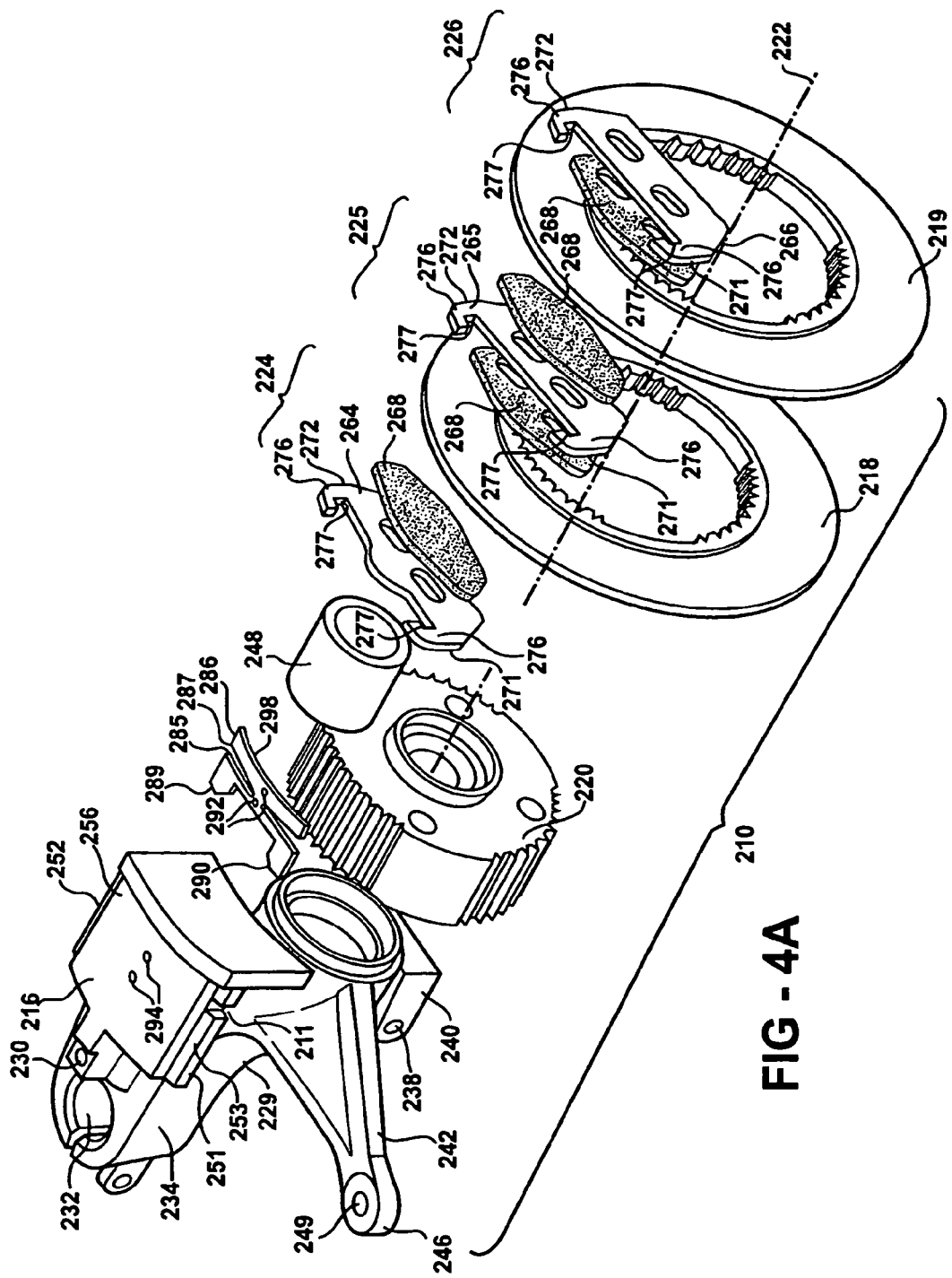
FIG. 4A illustrates a second alternative embodiment of the invention.
Figure 6:
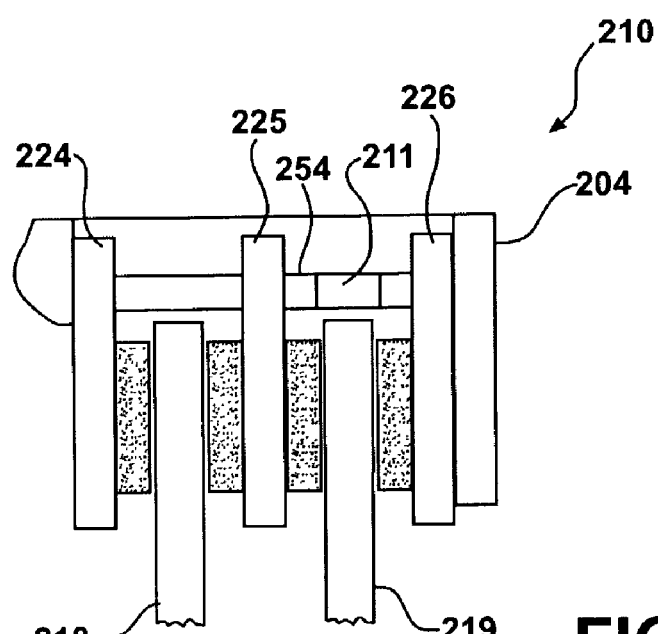
FIG. 6 shows an assembled partial front view of the second alternative embodiment.
Figure 5A:
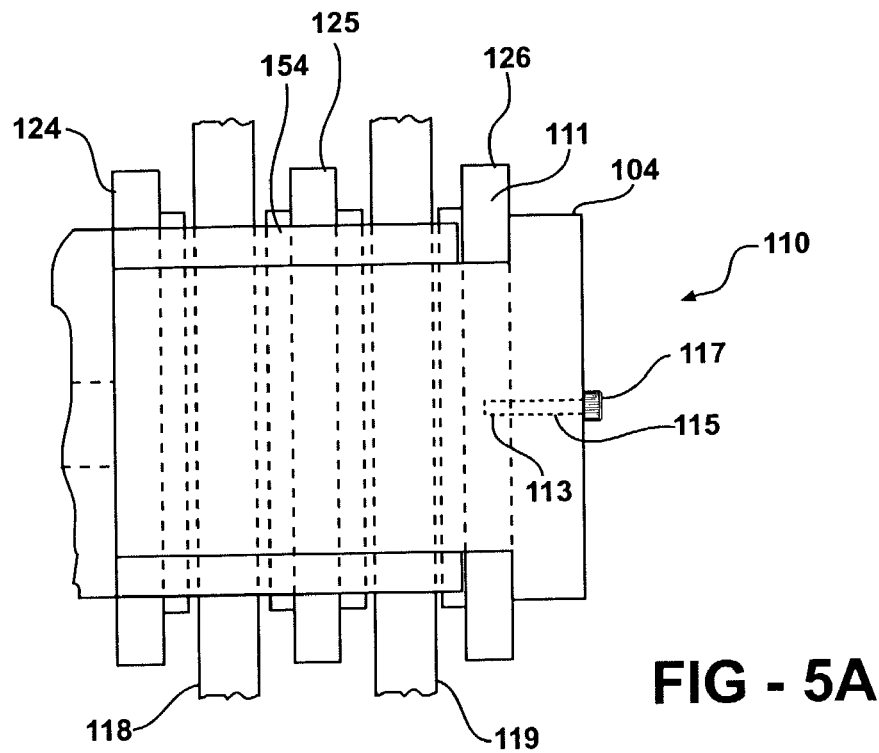
FIG. 5A is a top view of FIG. 5.
Figure 6A:
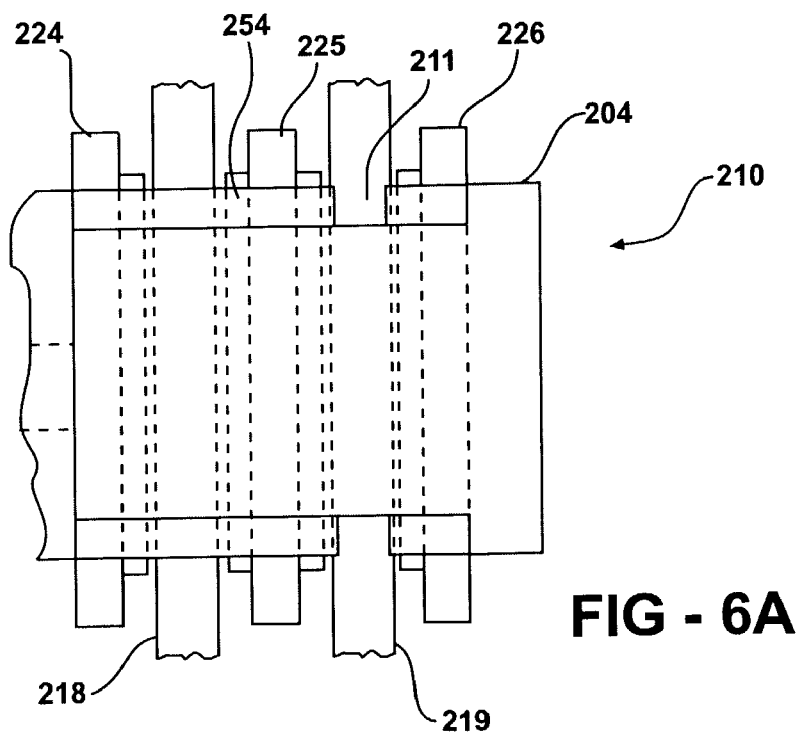
FIG. 6A is a top view of FIG. 6.

FIGS. 4A, 6, 6A illustrate a second embodiment of the invention wherein the same reference numerals are used to represent like parts and features, but are offset by 200.

As shown in FIG. 6 and FIG. 6A, instead of positioning the opening 111 adjacent the pad retainer 104, as in the previous embodiment, an opening 211 is positioned over one of the discs, shown here as an outer disc 219. An inner brake pad assembly 224 is disposed through the opening 211 and onto a slideway 254, followed by an intermediate brake pad assembly 225 being disposed through the opening 211 and onto the slideway 254. An outer brake pad assembly 226 is disposed into the opening 211 and towards a pad retainer 204 leaving a space between the intermediate brake pad assembly 225 and the outer brake pad assembly 226 for receiving the outer disc 219. As before, the inner disc 218 is received between the inner brake pad assembly 224 and the intermediate brake pad assembly 225. When fully assembled, there is no need for additional fasteners to attach the brake pad assemblies 224, 225, 226 to any part of the disc brake assembly 210. The brake pad assemblies 224, 225, 226 are prevented from disassembling from the slideway 254 as a result of the opening 211 being located over one of the discs 218, 219, shown here as the outer disc 219. It should be recognized however, that the opening 211 could just as well be located over the inner disc 218, or over both disc 218, 219, though this is not shown here.

Figure 7:
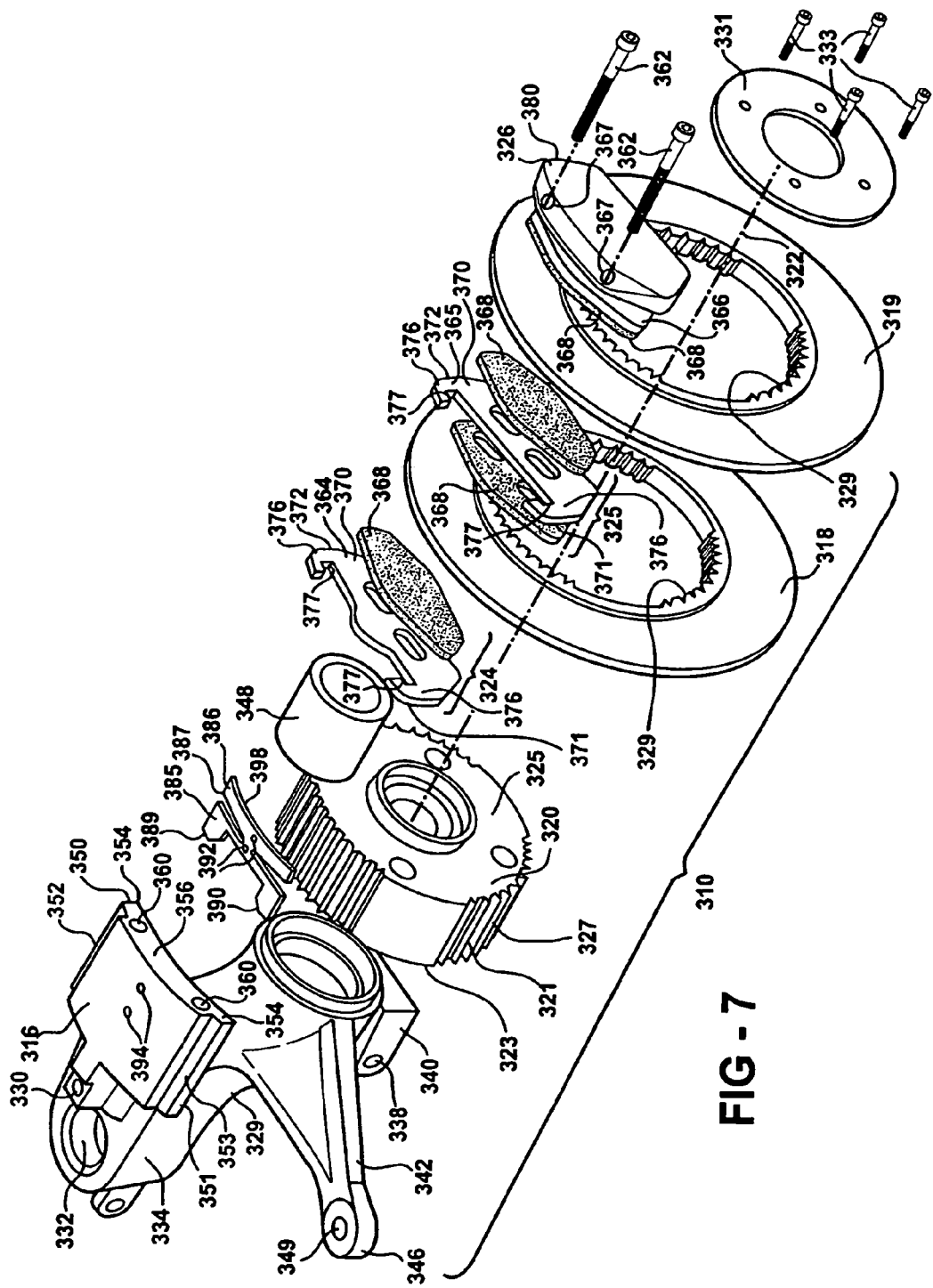
FIG. 7 shows an exploded isometric view of a brake assembly according to a third embodiment having a redundant restraint for maintaining a disc on a hub.
Figure 7A:
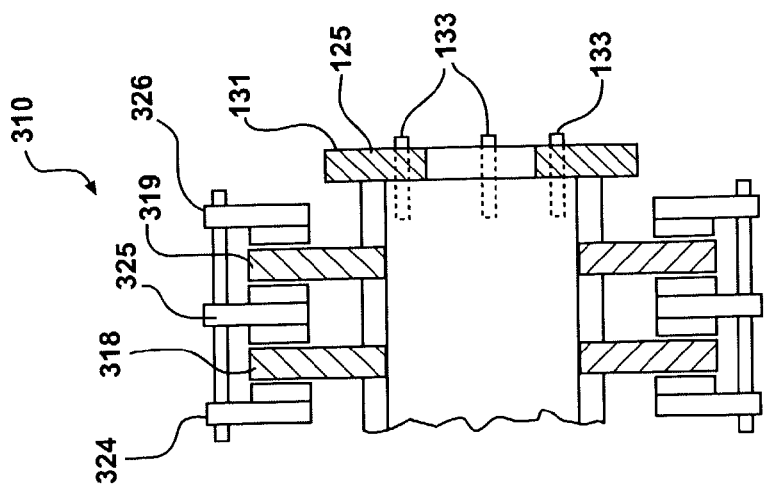
FIG. 7A shows an assembled partial front view of the brake assembly from FIG. 7.

FIGS. 7 and 7A illustrate a third alternative embodiment of the invention wherein the same reference numerals are used to designate like parts and features, but are offset by 300.

Disc brake assembly 310 has a knuckle body 329 formed as one piece with a bridge 316. The bridge 316 has at least one and preferably a pair of spaced apart fastener openings 360 at least partially therethrough. A rotatable wheel hub 320 has an outer surface 321 extending longitudinally between opposite ends 323, 325 and is connected to a constant velocity joint (not shown) so that the wheel hub 320 rotates with the constant velocity joint about an axis 322. The outer surface 321 of the wheel hub 320 has at least one spline and preferably a plurality of splines 327 so that an inner disc 318 and an outer disc 319 are supported by the wheel hub 320 against rotation relative to the wheel hub 320, while being slideable longitudinally along the outer surface 321 and toward the opposite ends 323, 325 of the wheel hub 320.

The inner and outer discs 318, 319 have teeth or splines 329 that mate with the splines 327 to provide for the longitudinal or axial sliding movement of the discs 318, 319 on the hub 320, while supporting the discs 318, 319 against rotation relative to the wheel hub 320.

An inner and intermediate brake pad assembly 324, 325 is disposed on the bridge 316 as in the previous embodiments, and the brake pad assembly 326, having a pair of spaced apart fastener openings 367 is attached to the bridge 316 by a pair of fasteners 362.

As shown in FIGS. 7 and 7A, a retaining structure, shown here as a plate 331 comprised of a single piece of material, abuts against one end 357 of the rotatable wheel hub 320 and is fastened thereto preferably a plurality of threaded fasteners 333. The plate 331 restricts removal of the discs 318, 319 from the end 325 of the wheel hub 320 by interfering with the splines 329 on the outer disc 319. Therefore, the discs 318, 319 and the inner and intermediate brake pad assemblies 324, 325 are maintained in a functional state in the event the fasteners detach from the bridge 316.

Figure 8A:
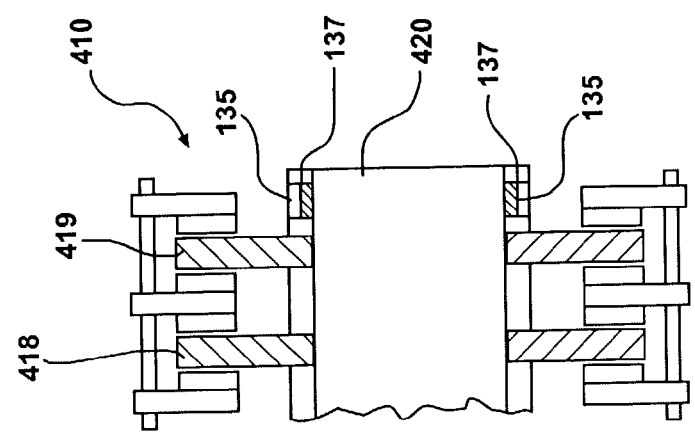
FIG. 8A shows an assembled partial front view of the brake assembly as shown in FIG. 8.
Figure 8:
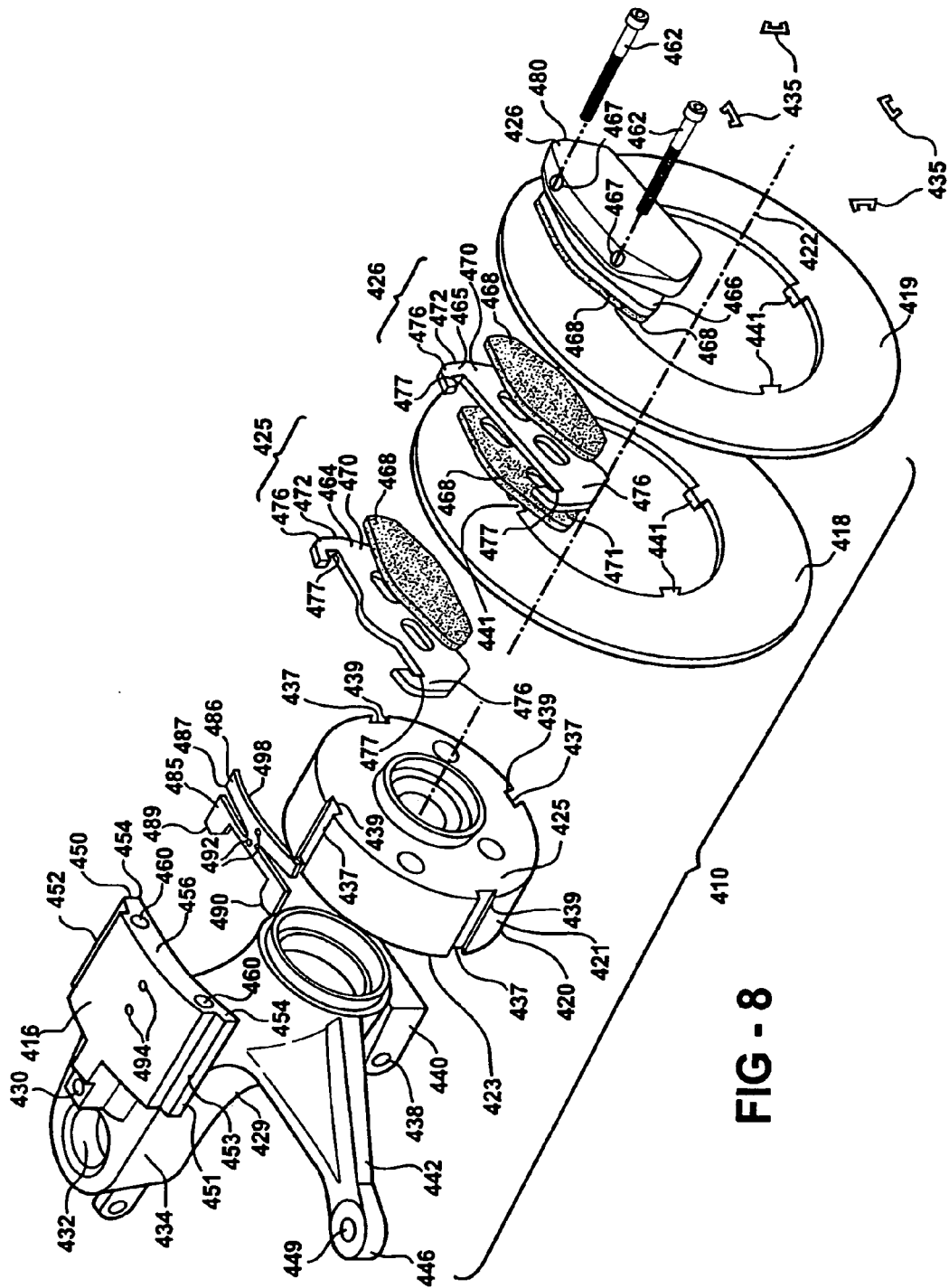
FIG. 8 shows an exploded isometric view of a brake assembly according to a fourth embodiment having an alternate redundant restraint for maintaining a disc on a hub.

FIGS. 8, 8A illustrate a fourth alternative embodiment of the invention wherein the same reference numerals are used to designate like parts and features, but are offset by 400.

As shown in FIGS. 8 and 8A, the disc brake assembly 410 has a plurality of retaining structures 135 that act between a rotatable wheel hub 420 and at least one disc, shown here as a pair of discs 418, 419 to restrict removal of the discs 418, 419 from the wheel hub 420. The wheel hub 420 preferably has a plurality (four shown) of slots 137 for receiving splines or teeth 139 extending inwardly from the discs 418, 419.

With the discs 418, 419 slideably received on the rotatable wheel hub 420, the retaining structures 435, illustrated preferably as spring clips, are disposed in the slots 437 of the wheel hub 420 and are maintained in the slots 437 as a result of spring force generated by the spring clips 435 biasing against inner surfaces 439 of the slots 437. The spring clips 435 interfere with the plurality of teeth 441 on the outer disc 419, thereby restricting removal of the discs 418, 419 from the wheel hub 420, in turn, maintaining the assembly 410 in a functional state.

Figure 9A:
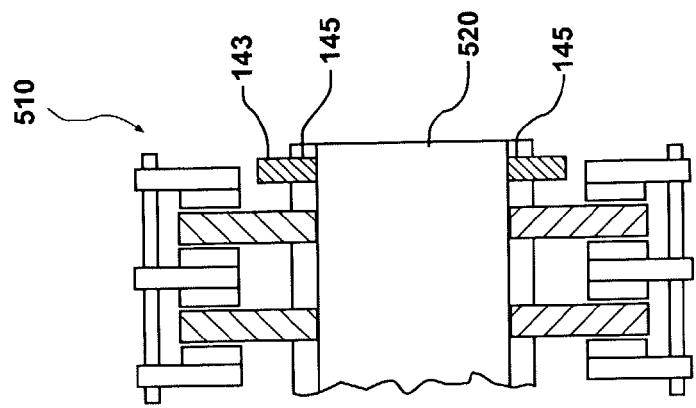
FIG. 9A shows an assembled partial front view of the brake assembly as shown in FIG. 9.
Figure 9:
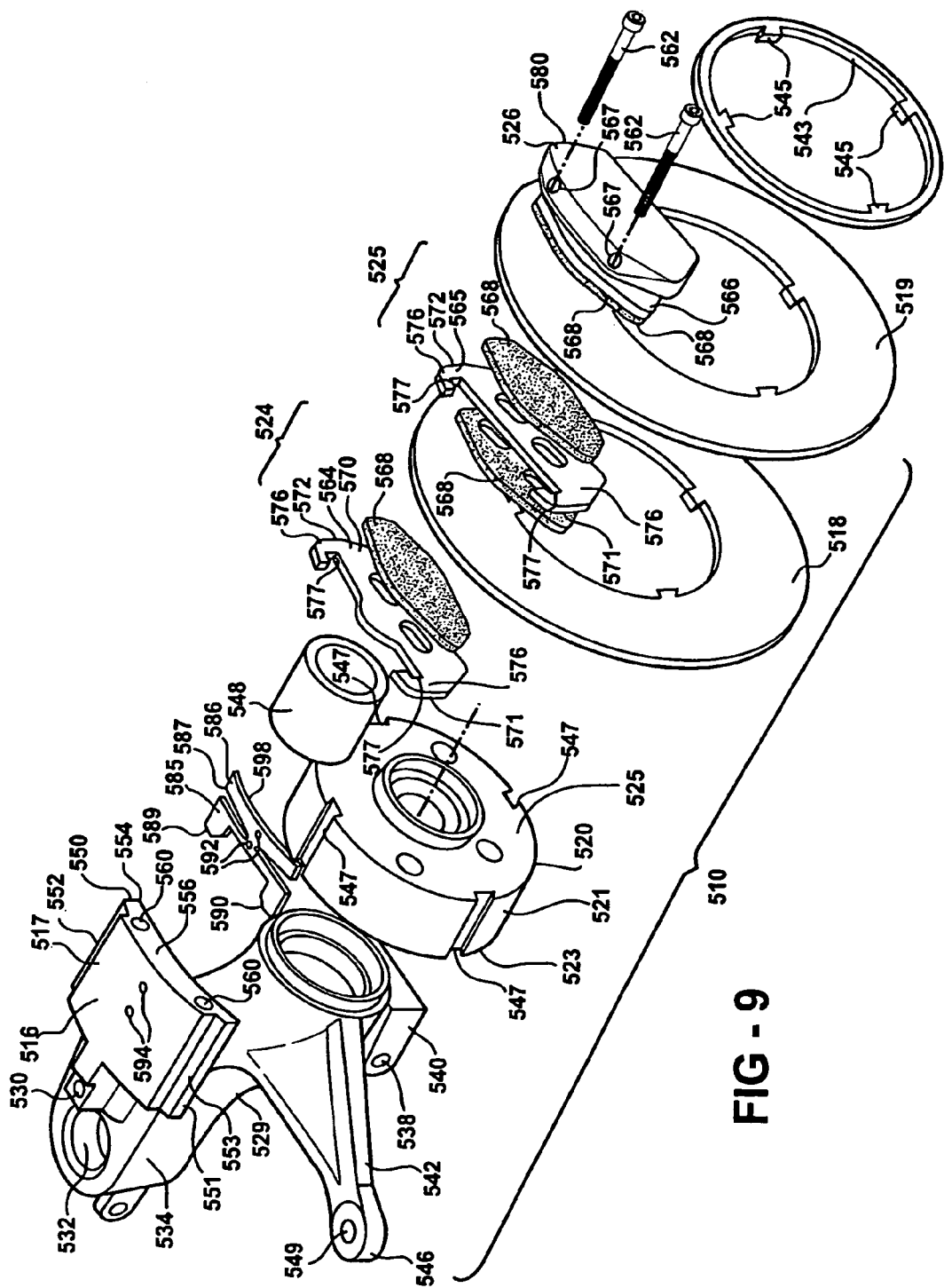
FIG. 9 shows an exploded isometric view of a brake assembly according to a fifth embodiment having an alternate redundant restraint for maintaining a disc on a hub of the brake assembly.

FIGS. 9, 9A illustrate a fifth alternative embodiment of the invention wherein the same reference numerals are used to designate like parts, but are offset by 500.

As shown in FIGS. 9 and 9A, a disc brake assembly 510 has a retaining structure illustrated as a ring structure 143, having inwardly extending projections 145 mating with slots 147 in the wheel hub 520. The projections 145 are preferably oversized in relation to the slots 147, thereby creating an interference or friction fit between the projections 145 and the slots 147. With the projections 145 disposed in the slots 147, the ring structure 143 is secured to the wheel hub 520 and prevents removal of an inner disc 518 and an outer disc 519 from the wheel hub 520 to maintain the assembly 510 in a functional state. A set screw or the like (not shown) can be used to further secure the ring structure 143 to the rotatable wheel hub 20.

Obviously, many modifications and variation of the present invention are possible in light of the above teachings. It is, therefore, to be understood that within the scope of the appended claims, the invention may be practiced otherwise then as specifically described. The invention is defined by the claims.

What is claimed is:

1. A brake pad assembly, comprising:

a backing plate fixed to a support plate;

a pair of fastener openings having axes provided in said support plate for receiving an associated pair of fasteners for coupling said support plate to a support structure;

a layer of friction material disposed on said backing plate;

a mechanical interlocking portion disposed on said support plate having at least one retaining surface extending transverse to said axes of said fastener openings for providing redundant coupling support of said brake pad assembly to the support structure independent of said fasteners to limit movement of said brake pad assembly parallel to said axes of said fastener openings to maintain said brake pad assembly connected to the support structure in operation under a condition where said fasteners are disconnected from said brake pad assembly and the supper structure; and a knuckle body having a bridge extending laterally from said knuckle body, said bridge having at least a pair of openings for receiving said fasteners for coupling said brake pad assembly to said bridge, said bridge having a slot for receiving said mechanical interlocking portion and having an engaging surface for engaging said at least one retaining surface of said mechanical interlocking portion for limiting movement of said brake pad assembly relative to said bridge independent of and parallel to said fasteners.

2. The brake pad assembly of claim 1 wherein fastener openings are spaced from one another having said mechanical interlocking portion disposed generally between said pair of fastener openings.

3. The brake pad assembly of claim 2 wherein said mechanical interlocking portion is spaced equidistant between said pair of fastener openings.

4. The brake pad assembly of claim 1 wherein said mechanical interlocking portion is generally T-shaped.

* * * * *